United States Patent
Briand et al.

(10) Patent No.: US 7,038,163 B2
(45) Date of Patent: May 2, 2006

(54) USE OF HELIUM/NITROGEN GAS MIXTURES IN UP TO 12 KW LASER WELDING

(75) Inventors: Francis Briand, Paris (FR); Karim Chouf, Epinay s/seine (FR); Philippe Lefebvre, Saint Ouen l'Aumône (FR); Eric Verna, Boissy l'Aillerie (FR)

(73) Assignee: L'air liquide, societe anonyme a directoire et conseil de surveillance pour l'etude et l'exploitation des procedes georges claude, Paris (FR)

( * ) Notice: Subject to any disclaimer, the term of this patent is extended or adjusted under 35 U.S.C. 154(b) by 0 days.

(21) Appl. No.: 10/457,671

(22) Filed: Jun. 9, 2003

(65) Prior Publication Data

US 2003/0230558 A1   Dec. 18, 2003

(30) Foreign Application Priority Data

Jun. 14, 2002   (FR) .................................. 02 07345

(51) Int. Cl.
B23K 26/00    (2006.01)
(52) U.S. Cl. ........................... 219/121.64; 219/121.63; 219/121.84
(58) Field of Classification Search ........... 219/121.64, 219/121.63, 121.84
See application file for complete search history.

(56) References Cited

U.S. PATENT DOCUMENTS

| | | | |
|---|---|---|---|
| 3,066,215 A | * | 11/1962 | Espy .......................... 219/74 |
| 3,939,323 A | * | 2/1976 | Meehan et al. ........ 219/121.64 |
| 4,507,540 A | * | 3/1985 | Hamasaki ............... 219/121.64 |
| 4,724,297 A | | 2/1988 | Nielsen |
| 4,750,947 A | * | 6/1988 | Yoshiwara et al. ......... 148/512 |
| 4,871,897 A | | 10/1989 | Nielsen |
| 4,891,077 A | | 1/1990 | Roll et al. |
| 5,539,180 A | * | 7/1996 | Mori et al. ............ 219/121.64 |
| 5,831,239 A | * | 11/1998 | Matubara et al. ....... 219/121.64 |
| 6,060,687 A | | 5/2000 | Faerber |
| 6,204,477 B1 | * | 3/2001 | Lai ..................... 219/137 WM |
| 6,281,472 B1 | * | 8/2001 | Faerber ................. 219/121.64 |
| 6,371,359 B1 | * | 4/2002 | Kimura et al. .............. 228/175 |
| 2003/0066868 A1 | * | 4/2003 | Eijkenboom et al. .... 228/262.1 |

FOREIGN PATENT DOCUMENTS

| | | |
|---|---|---|
| DE | 199 00 477 A | 7/2000 |
| DE | 199 61 697 A | 7/2001 |
| DE | 100 63 165 A | 6/2002 |
| WO | WO 02 38325 A | 5/2002 |
| WO | WO 0243918 A | 6/2002 |

OTHER PUBLICATIONS

French Search Report to FR 02 07345.

* cited by examiner

*Primary Examiner*—M. Alexandra Elve
(74) *Attorney, Agent, or Firm*—Linda K. Russell; Elwood Haynes

(57) ABSTRACT

Binary gas mixture for welding using a laser beam of up to 12 kW, consisting of 30% to 60% nitrogen by volume, the remainder (up to 100%) being helium. Application of this gas mixture to the welding of steel, stainless steel or titanium.

15 Claims, 1 Drawing Sheet

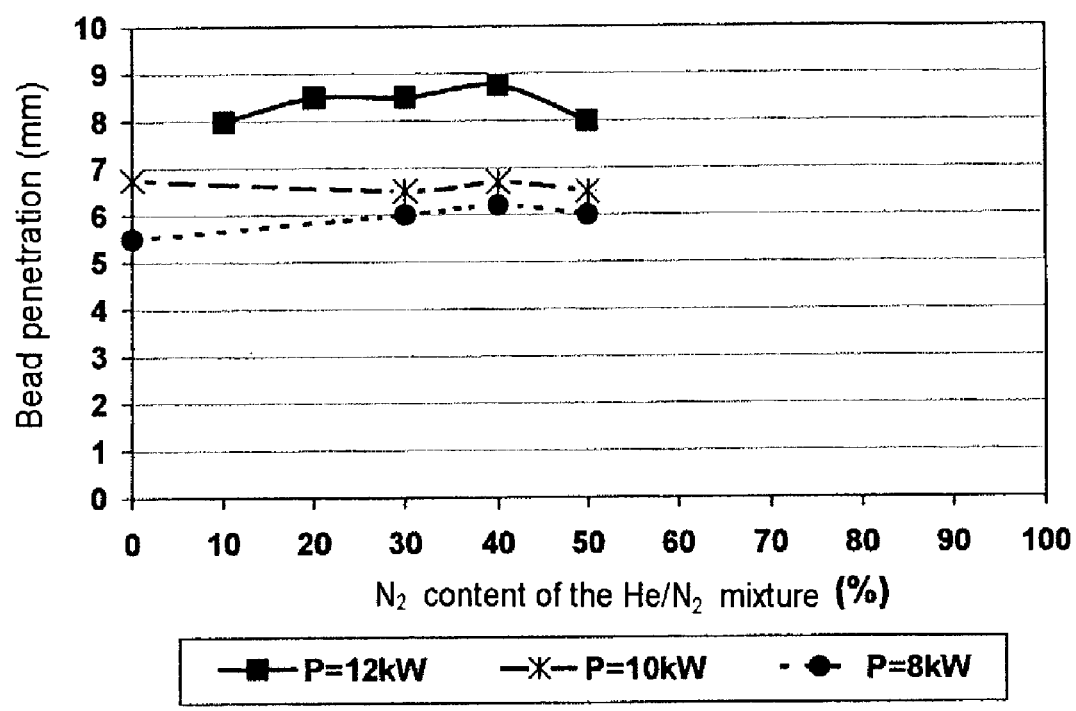

USE OF HELIUM/NITROGEN GAS MIXTURES IN UP TO 12 KW LASER WELDING

The present invention relates to a gas mixture formed solely from helium and nitrogen and to its use in a laser welding process operating at a maximum power of 12 kW.

Laser beam welding is a very high-performance joining process as it makes it possible to obtain, at high speeds, very great penetration depths compared with other more conventional processes, such as plasma welding, MIG (Metal Inert Gas) welding or TIG (Tungsten Inert Gas) welding.

This is explained by the high power densities involved when focusing the laser beam by one or more mirrors or lenses in the joint plane of the workpieces to be welded, for example power densities that may exceed $10^6$ W/cm$^2$.

These high power densities cause considerable vaporization at the surface of the workpieces which, expanding to the outside, induces progressive cratering of the weld pool and results in the formation of a narrow and deep vapour capillary called a keyhole in the thickness of the plates, that is to say in the joint plane.

This capillary allows the energy of the laser beam to be directly deposited depthwise in the plate, as opposed to the more conventional welding processes in which the energy deposition is localized on the surface.

In this regard, the following documents may be cited: DE-A-2 713 904, DE-A-4 034 745, JP-A-01048692, JP-A-56122690, WO 97/34730, JP-A-01005692, DE-A-4 123 716, JP-A-02030389, U.S. Pat. No. 4,871,897, JP-A-230389, JP-A-62104693, JP-A-15692, JP-A-15693, JP-A-15694, JP-A-220681, JP-A-220682, JP-A-220683, WO-A-88/01553, WO-A-98/14302, DE-A-3 619 513 and DE-A-3 934 920.

This capillary is formed from a metal vapour/metal vapour plasma mixture, the particular feature of which is that it absorbs the laser beam and therefore traps the energy within the actual capillary.

One of the problems with laser welding is the formation of a shielding gas plasma.

This is because the metal vapour plasma, by seeding the shielding gas with free electrons, may bring about the appearance of a shielding gas plasma which is prejudicial to the welding operation.

The incident laser beam may therefore be greatly disturbed by the shielding gas plasma.

The interaction of the shielding gas plasma with the laser beam may take various forms but it usually results in an effect whereby the incident laser beam is absorbed and/or diffracted and this may lead to a substantial reduction in the effective laser power density at the surface of the target, resulting in a reduction in the penetration depth, or even in a loss of coupling between the beam and the material and therefore a momentary interruption in the welding process.

The power density threshold at which the plasma appears depends on the ionization potential of the shielding gas used and is inversely proportional to the square of the wavelength of the laser beam.

Thus, it is very difficult to weld under pure argon with a $CO_2$-type laser, whereas this operation may be carried out with very much less of a problem with a YAG-type laser.

In general, in $CO_2$ laser welding, helium is used as shielding gas, this being a gas with a high ionization potential and making it possible to prevent the appearance of the shielding gas plasma, and to do so up to a laser power of at least 45 kW.

However, helium has the drawback of being an expensive gas and many laser users prefer to use other gases or gas mixtures that are less expensive than helium but which would nevertheless limit the appearance of the shielding gas plasma and therefore obtain welding results similar to those obtained with helium, but at a lower cost.

Thus, gas mixtures are commercially available that contain argon and helium, for example the gas mixture containing 30% helium by volume and the rest being argon, sold under the name LASAL™ 2045 by L'Air Liquide™, which make it possible to achieve substantially the same results as helium, for $CO_2$ laser power levels below 5 kW and provided that the power densities generated are not too high, that is to say above about 2000 kW/cm$^2$.

However, the problem that arises with this type of Ar/He mixture is that, for higher laser power densities, it is no longer suitable as the threshold at which the shielding gas plasma is created is then exceeded.

Moreover, it is also paramount for the penetration of the weld beads to be at least maintained, or even preferably increased, relative to the same laser welding process using helium.

Furthermore, yet another problem lies in the formation of NOx-type species, harmful to the welder, which must be kept as low as possible.

This is because the metal plasma temperatures, resulting from laser/material interactions as strong as those involved in laser welding, are conducive to the dissociation of nitrogen and oxygen molecules coming from air contamination and lead to the formation of harmful NOx-type species.

Consequently, to avoid or reduce the production of NOx-type species, it is essential to be able to reduce the temperature of the metal plasma resulting from laser welding.

The object of the present invention is therefore to provide a welding gas mixture based on nitrogen and a laser welding process using this gas, able to be used with a laser having a power of up to 12 kW, which gas leads to the formation of a less hot metal plasma, with a total penetration from 5 to 10% greater than that obtained with the conventional gases used for such power levels, namely helium, depending on the power and the nitrogen content of the gas, and to a reduction in the formation of NOx compared with helium by itself.

The solution of the invention is therefore a binary gas mixture for welding using a laser beam of up to 12 kW, consisting of 30% to 60% nitrogen by volume, the remainder (up to 100%) being helium.

Depending on the case, the gas of the invention may include one or more of the following technical features:
  it contains less than 59% nitrogen by volume, preferably less than 58% nitrogen, preferably less than 55%;
  it contains more than 50% nitrogen, preferably more than 52% nitrogen;
  it preferably contains 53 to 55% nitrogen.

According to another aspect, the invention also relates to a welding process using a laser beam having a power ranging up to 12 kW, in which a gas mixture according to the invention is used for welding steel, stainless steel or titanium workpieces.

Depending on the case, the process of the invention may include one or more of the following technical features:
  the laser is of the $CO_2$ type;
  a welding operation is carried out to join two workpieces to be welded together with at least partial penetration, preferably full penetration;
  a laser having a power from 0.5 to 12 kW, preferably between 4 and 10 kW, is used;

workpieces having a thickness ranging from 0.4 to 30 mm, preferably from 1 mm to 10 mm, are welded;

the workpieces are made of HYS (High Yield Strength) steel;

the workpieces to be welded have a zinc surface coating, particularly galvanized or electrogalvanized steel plates;

the workpieces to be welded are placed together and lap or butt welded, by backside welding or at an angle, and with or without a bevel;

the welding takes place with a single—or multiple-spot focal spot (impact);

the focal spot is circular or oblong;

the gas flow rate is between 5 l/min and 100 l/min;

the pressure of the gas is between 1 and 5 bar; and the nozzle delivering the gas is a lateral or axial nozzle having a diameter ranging from 3 to 30 mm.

EXAMPLE

Measurement of the Penetration of Lines of Melting Produced with a $CO_2$ Laser and Shielding Gases Formed from $He/N_2$ Mixtures The curves in the appended FIGURE show measurements of the penetration of lines of melting produced with a $CO_2$-type laser (for power levels ranging from 8 kW to 12 kW) focused on the surface of a metal target made of mild steel by a parabolic mirror possessing a focal length of 200 mm, and for variable helium and nitrogen contents of the shielding gas.

More precisely, the shielding gas was formed from $He/N_2$ mixtures having a progressively increased nitrogen content (the remainder of the mixture being only helium).

For each curve, the nitrogen content of the mixture used is plotted as a percentage by volume on the x-axis.

The gas was delivered in the interaction zone by a lateral nozzle of cylindrical shape with a diameter of 12 mm, at a flow rate of 24 l/min. The welding speed was 3 m/min.

It may be seen in the curves appended hereto that the penetration of the weld beads is at least maintained for laser power levels of between 8 and 12 kW; in some cases, an increase in the penetration of the beads of around 5 to 10% is even observed.

During production of these beads, it was found that a "plasma" and/or "plume" forms in the shielding gas above the interaction zone and above the metal plasma plume. The dimensions of the shielding gas plasma and/or plume depended on the nitrogen content of the mixture, on the incident laser power density, on the focal length and on the welding speed. A priori it may have large dimensions, ranging up to several centimeters.

It seems that the formation of this plasma and/or plume in the shielding gas is associated with the presence of nitrogen molecules and/or atoms near the interaction zone. The associated consequences of the presence of this gas plasma and/or plume around the interaction zone are different from those observed in the case of He/Ar mixtures.

This is because, unlike He/Ar mixtures in which the ionization of the argon atoms during the laser welding process result in the formation of a plasma in the shielding gas which could be deleterious to the laser welding process, the gas plasma and/or plume obtained with $He/N_2$ mixtures does not impair the welding process.

In the case of $He/N_2$ mixtures, the coupling between the material and the laser beam is maintained, or sometimes even improved. Only high nitrogen contents in the $He/N_2$ mixture significantly impair the laser/material coupling.

The improvement in the penetration seems to result from the cooling of the metal plasma plume induced by the dissociation of the nitrogen molecules of the mixture in contact with it.

This would therefore lead to a reduction in the size of the metal plasma plume at the surface of the plate and to a reduction in the phenomenon of absorption of the incident laser beam by the plume and an increase in the amount of laser energy available at the surface of the plate and in the capillary.

In addition, the exothermic recombination of the nitrogen atoms or ions at the surface of the walls of the capillary must also contribute to improving the process.

Furthermore, it has also been demonstrated during tests using $He/N_2$ mixtures that there is an appreciable reduction in the amount of NOx generated, depending on the nitrogen contents and laser power densities involved, compared with the amount of NOx generated with helium alone.

This is because the dissociation of nitrogen molecules, when injected into the laser/material interaction zone, absorbs some of the energy of the metal plasma and cools it.

This partly explains the reduction in the formation of NOx species around the metal plasma plume during laser welding in the laser welding process.

The content of NOx emitted during the laser welding process carried out at a speed of about 3 m/min for laser power levels of 2 kW and 8 kW was measured. The shielding gas was brought in laterally to the displacement by a nozzle 8 mm in diameter at 20 l/min. Various $He/N_2$ mixtures were used. The sampling was effected by a stainless steel probe 3 mm in diameter, which sucked up all the gases emitted by the welding process. The gases collected then passed into a standardized analyser capable of detecting the NOx-type elements and of determining their proportions. The sampling probe was positioned 2 cm from the surface of the plate, 1.5 cm from the interaction zone, in the extension of the gas flow.

The measurements carried out are given in the following table.

TABLE

| $He/N_2$ mixtures | 100%/0 | | 70%/30% | | 50%/50% | | 30%/70% | | 0/100% | |
|---|---|---|---|---|---|---|---|---|---|---|
| (kW)\(ppm) | NO | NOx | NO | NOx | NO | NOx | NO | NOx | NO | NOx |
| 2 kW | 13.5 | 13.5 | | | 2.1 | 2.4 | | | 1.3 | 1.4 |
| 8 kW | 70.8 | 70.8 | 40.6 | 40.6 | 33.6 | 33.5 | | | 2 | 2 |

It may be seen that there is an appreciable reduction in the contents of NOx emitted during the laser welding process when the nitrogen content of the $He/N_2$ shielding gas mixture increases.

The invention claimed is:

1. A process of welding comprising welding at least one workpiece with a laser beam means and a binary gas mixture, wherein:
    a) said workpiece is between about 0.4 mm and about 30 mm thick;
    b) said binary gas mixture consists essentially of:
        1) nitrogen, wherein said nitrogen comprises a range of about 50% to about 59%; and
        2) helium; and
    c) said workpiece comprises at least one member selected from the group consisting of:
        1) steel, wherein said steel comprises a zinc surface coating;
        2) titanium; and
        3) stainless steel.

2. The process according to claim 1, wherein said nitrogen comprises a range of about 52% to about 58%.

3. The process according to claim 2, wherein said nitrogen comprises a range of about 53% to about 55%.

4. A process of welding comprising welding at least one workpiece with a laser beam means and a binary gas mixture, wherein:
    a) said workpiece is between about 0.4 mm and about 30 mm thick;
    b) said binary gas mixture consists essentially of:
        1) nitrogen; and
        2) helium; and
    c) said workpiece comprises at least one member selected from the group consisting of:
        1) steel, wherein said steel comprises a zinc surface coating;
        2) titanium; and
        3) stainless steel;
    wherein said process of welding further comprises joining two said workpieces with at least partial penetration up to full penetration, and
    wherein welding said workpieces is performed by at least one method selected from the group consisting of lap, butt backside, at an angle and with or without a bevel.

5. A process of welding comprising welding at least one workpiece with a laser beam means and a shielding gas, wherein:
    a) said workpiece comprises at least one member selected from the group consisting of:
        1) steel workpieces;
        2) titanium workpieces; and
        3) stainless steel workpieces;
    b) said workpiece is between about 1 mm and about 10 mm thick;
    c) said laser beam means has a power of less than about 12 kW; and
    d) said shielding gas is a binary gas mixture, wherein said shielding gas comprises:
        1) about 30% to about 60% nitrogen, by volume;
        2) the remainder comprising helium; and
    e) said workpieces are placed together and welded in at least one way selected from the group consisting of:
        1) lap welded;
        2) butt welded;
        3) backside welded; and
        4) welded at an angle;
    wherein the workpiece is made of zinc-coated steel.

6. A process of welding comprising welding at least one workpiece with a laser beam means and a shielding gas, wherein:
    a) said workpiece comprises at least one member selected from the group consisting of:
        1) steel workpieces;
        2) titanium workpieces; and
        3) stainless steel workpieces;
    b) said workpiece is between about 1 mm and about 10 mm thick;
    c) said laser beam means has a power of less than about 12 kW; and
    d) said shielding gas is a binary gas mixture, wherein said shielding gas comprises:
        1) about 30% to about 60% nitrogen, by volume:
        2) the remainder comprising helium; and
    e) said workpieces are placed together and welded in at least one way selected from the group consisting of:
        1) lap welded;
        2) butt welded;
        3) backside welded; and
        4) welded at an angle;
    wherein the binary gas mixture contains more than about 50% of nitrogen by volume.

7. A process of welding comprising welding at least one workpiece with a laser beam means and a shielding gas, wherein:
    a) said workpiece comprises at least one member selected from the group consisting of:
        1) steel workpieces;
        2) titanium workpieces; and
        3) stainless steel workpieces;
    b) said workpiece is between about 1 mm and about 10 mm thick;
    c) said laser beam means has a power of less than about 12 kW; and
    d) said shielding gas is a binary gas mixture, wherein said shielding gas comprises:
        1) about 30% to about 60% nitrogen by volume;
        2) the remainder comprising helium; and
    e) said workpieces are placed together and welded in at least one way selected from the group consisting of:
        1) lap welded;
        2) butt welded;
        3) backside welded; and
        4) welded at an angle;
    wherein at least one workpiece to be welded has a thickness from about 1 mm to about 10 mm.
    wherein said workpieces are placed together and welded in at least on way selected from the group consisting of lap welded, butt welded, backside welded or welded at an angle, and
    wherein the workpieces are beveled.

8. A process of welding comprising welding at least one workpiece with a laser beam means and a shielding gas, wherein:
    a) said workpiece comprises at least one member selected from the group consisting of:
        1) steel workpieces;
        2) titanium workpieces; and
        3) stainless steel workpieces;
    b) said workpiece is between about 1 mm and about 10 mm thick;
    c) said laser beam means has a power of less than about 12 kW; and
    d) said shielding gas is a binary gas mixture, wherein said shielding gas comprises:
        1) about 30% to about 60% nitrogen, by volume;
        2) the remainder comprising helium; and e) said workpieces are placed together and welded in at least one way selected from the group consisting of:
  1) lap welded;
  2) butt welded;
  3) backside welded; and
  4) welded at an angle;
wherein the binary gas mixture contains more than about 52% of nitrogen by volume.

9. A process of welding comprising welding at least one workpiece with a laser beam means and a shielding gas, wherein:
  a) said workpiece comprises at least one member selected from the group consisting of:
    1) steel workpieces;
    2) titanium workpieces; and
    3) stainless steel workpieces;
  b) said workpiece is between about 1 mm and about 10 mm thick;
  c) said laser beam means has a power of less than about 12 kW; and
  d) said shielding gas is a binary gas mixture, wherein said shielding gas comprises:
    1) about 30% to about 60% nitrogen, by volume;
    2) the remainder comprising helium; and
  e) said workpieces are placed together and welded in at least one way selected from the group consisting of:
    1) lap welded;
    2) butt welded;
    3) backside welded; and
    4) welded at an angle;
wherein the binary gas mixture consists of about 53% to about 55% of nitrogen by volume, and the remainder comprising helium.

10. A process of welding comprising welding at least one workpiece with a laser beam means and a binary gas mixture, wherein:
  a) said workpiece is between about 0.4 mm and about 30 mm thick; and
  b) said binary gas mixture consists essentially of:
    1) about 50% to about 59% nitrogen, by volume; and
    2) helium.

11. A process of welding comprising welding at least one workpiece with a laser beam means and a binary gas mixture, wherein:
  a) said workpiece is between about 0.4 mm and about 30 mm thick; and
  b) said welding comprises joining two said workpieces with at least partial penetration and, wherein said joining comprises at least one member selected from the group consisting of:
    1) lap joining;
    2) butt backside joining;
    3) joining at an angle;
    4) joining with a bevel; and
    5) joining without a bevel; and
  c) said binary gas mixture consists essentially of:
    1) nitrogen; and
    2) helium.

12. A process of welding comprising welding at least one workpiece with a laser beam means and a shielding gas, wherein:
  a) said workpiece is made of zinc-coated steel, and is between about 0.4 mm and about 30 mm thick;
  b) said laser beam means has a power of less than about 12 kW; and
  c) said shielding gas is a binary gas mixture, wherein said shielding gas comprises:
    1) about 30% to about 60% nitrogen, by volume; and
    2) the remainder comprising helium.

13. A process of welding comprising welding at least one workpiece with a laser beam means and a shielding gas, wherein:
  a) said workpiece comprises at least one member selected from the group consisting of:
    1) steel workpieces;
    2) titanium workpieces; and
    3) stainless steel workpieces;
  b) said workpiece is between about 0.4 mm and about 30 mm thick;
  c) said laser beam means has a power of less than about 12 kW; and
  d) said shielding gas is a binary gas mixture, wherein said shielding gas comprises:
    1) at least about 50% nitrogen, by volume; and
    2) the remainder comprising helium.

14. A process of welding comprising welding at least one workpiece with a laser beam means and a shielding gas, wherein:
  a) said workpiece comprises at least one member selected from the group consisting of:
    1) steel workpieces;
    2) titanium workpieces; and
    3) stainless steel workpieces;
  b) said workpiece is between about 0.4 mm and about 30 mm thick;
  c) said laser beam means has a power of less than about 12 kW; and
  d) said shielding gas is a binary gas mixture, wherein said shielding gas comprises:
    1) about 30% to about 60% nitrogen, by volume; and
    2) the remainder comprising helium; and
  e) said welding comprises at least one member selected from the group consisting of:
    1) lap welding;
    2) butt welding;
    3) backside welding; and
    4) angle welding.

15. A process of welding comprising welding at least one workpiece with a laser beam means and a shielding gas, wherein:
  a) said workpiece comprises at least one member selected from the group consisting of:
    1) steel workpieces;
    2) titanium workpieces; and
    3) stainless steel workpieces;
  b) said workpiece is between about 0.4 mm and about 30 mm thick;
  c) said laser beam means has a power of less than about 12 kW; and
  d) said shielding gas is a binary gas mixture, wherein said shielding gas comprises:
    1) about 53% to about 55% nitrogen, by volume; and
    2) the remainder comprising helium.

* * * * *